United States Patent
Kuchi

(10) Patent No.: US 10,448,407 B2
(45) Date of Patent: Oct. 15, 2019

(54) INTERFERENCE CANCELLATION ENHANCEMENT IN HETNETS THROUGH COORDINATED SIMO/MIMO INTERFERENCE CODES

(71) Applicant: INDIAN INSTITUTE OF TECHNOLOGY HYDERABAD, Hyderabad (IN)

(72) Inventor: Kiran Kumar Kuchi, Hyderabad (IN)

(73) Assignee: INDIAN INSTITUTE OF TECHNOLOGY HYDERABAD, Andhra Pradesh, Hyderabad (IN)

(*) Notice: Subject to any disclaimer, the term of this patent is extended or adjusted under 35 U.S.C. 154(b) by 601 days.

(21) Appl. No.: 14/890,461

(22) PCT Filed: May 16, 2014

(86) PCT No.: PCT/IN2014/000332
§ 371 (c)(1),
(2) Date: Nov. 11, 2015

(87) PCT Pub. No.: WO2014/184811
PCT Pub. Date: Nov. 20, 2014

(65) Prior Publication Data
US 2016/0100411 A1  Apr. 7, 2016

(30) Foreign Application Priority Data
May 16, 2013 (IN) .......................... 2160/CHE/2013

(51) Int. Cl.
*H04W 72/08* (2009.01)
*H04W 8/12* (2009.01)
(Continued)

(52) U.S. Cl.
CPC ............ *H04W 72/08* (2013.01); *H04B 7/022* (2013.01); *H04B 7/024* (2013.01); *H04B 7/0413* (2013.01);
(Continued)

(58) Field of Classification Search
CPC ....... H04W 72/08; H04W 16/14; H04W 8/12; H04W 84/045; H04W 88/06;
(Continued)

(56) References Cited

U.S. PATENT DOCUMENTS 9,042,361 B2 * 5/2015 Makhlouf ............. H04W 72/02
370/338
10,091,697 B1 * 10/2018 Uplenchwar ......... H04W 24/10
(Continued)

FOREIGN PATENT DOCUMENTS

EP        2590336       *  7/2011
EP        2590336 A1    * 11/2011

*Primary Examiner* — Siming Liu

(57) ABSTRACT

The embodiments herein disclose a method and system for interference cancellation in a Heterogeneous Network (HetNet) including a base station serving a User Equipment (UE), and a plurality of neighbor base stations. Further, the method includes sharing a parameter associated with the base station serving the UE and the plurality of neighbor base stations in the HetNet. Further, the method includes determining whether the UE is experiencing interference from the neighbor base station based on the parameters. Further, the method includes coordinating with the base station serving the UE to cancel the level of interference experienced by the UE based on the transmission mode associated with each base station serving the UE and the neighbor base station interfering at the UE. The transmission mode is one of a Single-Input and Multiple-Output (SIMO) and Multiple-Output and Multiple-Output (MIMO) mode.

39 Claims, 4 Drawing Sheets

(51) Int. Cl.
*H04W 16/14* (2009.01)
*H04B 7/024* (2017.01)
*H04B 7/06* (2006.01)
*H04B 7/08* (2006.01)
*H04B 7/022* (2017.01)
*H04B 7/0413* (2017.01)
*H04W 84/04* (2009.01)
*H04W 88/06* (2009.01)
*H04W 88/10* (2009.01)

(52) U.S. Cl.
CPC ......... *H04B 7/0689* (2013.01); *H04B 7/0871* (2013.01); *H04W 8/12* (2013.01); *H04W 16/14* (2013.01); *H04W 84/045* (2013.01); *H04W 88/06* (2013.01); *H04W 88/10* (2013.01)

(58) Field of Classification Search
CPC ....... H04W 88/10; H04B 7/022; H04B 7/024; H04B 7/0413; H04B 7/0689; H04B 7/0871
See application file for complete search history.

(56) References Cited

U.S. PATENT DOCUMENTS

| | | | | |
|---|---|---|---|---|
| 2006/0229089 | A1* | 10/2006 | Tokgoz | H04B 17/345 455/501 |
| 2007/0140168 | A1* | 6/2007 | Laroia | H04W 24/08 370/330 |
| 2008/0008147 | A1* | 1/2008 | Nakayama | H04W 72/082 370/338 |
| 2008/0095133 | A1* | 4/2008 | Kodo | H04W 72/1278 370/342 |
| 2010/0009634 | A1* | 1/2010 | Budianu | H04W 52/244 455/63.1 |
| 2010/0238888 | A1* | 9/2010 | Sampath | H04W 24/02 370/329 |
| 2011/0249642 | A1* | 10/2011 | Song | H04W 28/16 370/329 |
| 2011/0294529 | A1* | 12/2011 | Luo | H04L 5/0035 455/509 |
| 2012/0021753 | A1* | 1/2012 | Damnjanovic | H04W 72/082 455/450 |
| 2012/0040687 | A1* | 2/2012 | Siomina | G01S 5/0205 455/456.1 |
| 2012/0057535 | A1* | 3/2012 | Zhang et al. | |
| 2012/0282864 | A1* | 11/2012 | Dimou | H04W 36/22 455/67.14 |
| 2013/0010880 | A1* | 1/2013 | Koivisto | H04B 7/0469 375/259 |
| 2013/0044697 | A1* | 2/2013 | Yoo et al. | |
| 2013/0088986 | A1* | 4/2013 | Xiao et al. | |
| 2013/0208604 | A1* | 8/2013 | Lee | H04L 25/0226 370/252 |
| 2013/0281089 | A1* | 10/2013 | Chandrasekhar | H04W 24/02 455/434 |
| 2013/0310077 | A1* | 11/2013 | Siomina | H04W 4/02 455/456.2 |
| 2014/0206329 | A1* | 7/2014 | Martin | H04W 24/10 455/418 |
| 2014/0248885 | A1* | 9/2014 | Van Lieshout | H04W 36/0094 455/437 |
| 2014/0293971 | A1* | 10/2014 | Yoo | H04W 56/003 370/336 |
| 2014/0301309 | A1* | 10/2014 | Luo | H04W 24/02 370/329 |
| 2015/0011229 | A1* | 1/2015 | Morita | H04W 52/244 455/448 |
| 2015/0078257 | A1* | 3/2015 | Wu | H04L 25/0224 370/328 |
| 2015/0078344 | A1* | 3/2015 | Futaki | H04W 24/02 370/332 |
| 2015/0282188 | A1* | 10/2015 | Stanze | H04W 72/082 370/329 |
| 2015/0373732 | A1* | 12/2015 | Davydov | H04L 5/00 370/329 |

* cited by examiner

INTERFERENCE CANCELLATION ENHANCEMENT IN HETNETS THROUGH COORDINATED SIMO/MIMO INTERFERENCE CODES

PRIORITY DETAILS

The present application is a National Phase Application for PCT application No. PCT/IN2014/000332 based on and claiming priority to IN Application No. 2160/CHE/2013 filed on 16 May 2013, the disclosure of which is hereby incorporated by reference.

TECHNICAL FIELD

The present invention generally relates to Heterogeneous Networks (HetNets), and more particularly to interference cancellation or suppression in the HetNet through coordinated Single-Input and Multiple-Output (SIMO) and Multiple-Input and Multiple-Output (MIMO) interference codes.

BACKGROUND

In wireless communications, the HetNets employ conventional Macro base stations (BS) with large coverage area while a number of small base stations (i.e. Pico base stations) can be deployed opportunistically within the coverage area of the Macro base station (See FIG. 1). A User Equipment (UE) may communicate with the BS via the downlink and uplink. The downlink (or forward link) refers to the communication link from the BS to the UE, and the uplink (or reverse link) refers to the communication link from the UE to the base station. On the downlink communication, a transmission from the BS may encounter interference due to transmissions from neighbor base stations or from other wireless radio frequency (RF) transmitters. As a consequence, such UEs may experience relatively low signal-to-interference-and-noise ratios (SINRs), and thus typically receive much lower data rates than UEs located nearer to the base station.

Generally, when the user enters the HetNet, it identifies the pair of Macro and Pico BSs with highest received power level and can determine the ratio of power levels of the Pico and Macro BSs. For example, let the ratio be denoted as $\gamma$. The user associates with the Pico BS if $\gamma$>Bias otherwise it associates with the Macro BS. The biased association controls the percentage of users associated with the Pico BSs. Since the Macro BS has significantly higher transmitter power compared to the Pico BS, it has higher coverage footprint. Choosing a bias value of less than 1 ensures that more the users are associated with the Pico BS thus enhancing its utility.

Currently, co-channel interference limits the capacity of conventional homogeneous cellular networks. In the downlink, since the UE is generally connected to the BS with the largest received power and the interference power received from any other BSs is less than the serving BS power. Therefore, the total interference power has a tamed distribution. As a result, interference causes an acceptable degradation in Spectral Efficiency (SE). The Pico BSs within the coverage area of Macro BSs can lead to mutual interference between the Macro and Pico BSs. Though the biased BS association controls the interference to some extent, the total interference contributed by the Macro and Pico BSs may lead to significantly lower cell edge performance. In spite of the increase in interference levels, the overall reduction in mean spectral efficiency (SE) of a Macro/Pico BSs are considered to be acceptable, since the overall capacity of the network scales linearly with the total number of BSs.

Thus, there is need in the art for improving the interference suppression by using coordinated SIMO/MIMO codes among plurality of base stations in the HetNets.

The above information is presented as background information only to help the reader to understand the present invention. Applicants have made no determination and make no assertion as to whether any of the above might be applicable as Prior Art with regard to the present application.

OBJECT OF INVENTION

The principal object of the embodiments herein is to provide methods and systems for cancelling or suppressing a level of interference in a heterogeneous network.

Another object of the embodiments herein is to provide a system and method for enhancing cell edge performance of user equipments with high interference in downlink.

Another object of the embodiments herein is to provide a mechanism for improving the interference suppression by using coordinated Single-Input and Multiple-Output (SIMO) and Multiple-Input and Multiple-Output (MIMO) codes among plurality of base stations in the heterogeneous network.

Another object of the embodiments herein is to provide a mechanism for suppressing a level of interference at user equipment based on transmission mode associated with base station in the heterogeneous network.

Another object of the embodiments herein is to provide a mechanism for coordinating between base stations to suppress a level of interference in the heterogeneous network.

SUMMARY

Accordingly the embodiments herein provides a method for suppressing interference in a Heterogeneous Network (HetNet) including a base station serving a User Equipment (UE), and a plurality of neighbor base stations. The method includes sharing a parameter associated with the base station serving the UE and the plurality of neighbor base stations in the HetNet. Further, the method includes determining whether the UE is experiencing interference from the neighbor base station based on the parameter. Further, the method includes coordinating with the base station serving the UE to suppress a level of interference experienced by the UE based on the transmission mode associated with each base station serving the UE and the neighbor base station interfering at the UE. The transmission mode can be Single-Input and Multiple-Output (SIMO) mode and Multiple-Input and Multiple-Output (MIMO) mode.

Accordingly the embodiments herein, provide a system for suppressing interference in a Heterogeneous Network (HetNet) at a base station serving a User Equipment (UE), and a plurality of neighbor base stations. Further, the system can be configured to share a parameter associated with the base station serving the UE and the plurality of neighbor base stations in the HetNet. Further, the system can be configured to determine whether the UE is experiencing interference from the neighbor base station based on the received parameter. Further, the system is configured to coordinate with the base station serving the UE to suppress the level of interference experienced by the UE based on a transmission mode associated with each base station serving the UE and the neighbor base station interfering at the UE.

The transmission mode is can be a Single-Input and Multiple-Output (SIMO) mode, and Multiple-Input and Multiple-Output (MIMO) mode.

Accordingly the embodiments herein provides a UE for suppressing interference in a HetNet including a base station serving the UE, and a plurality of neighbor base stations. The UE includes an integrated circuit and the circuit includes a processor, and a memory having a computer program code within the circuit. The memory and the computer program code with the processor causes the UE to share the parameter associated with the base station serving the UE and the plurality of neighbor base stations in the HetNet. Further, the UE includes determining whether the UE is experiencing interference from the neighbor base station based on the parameter. Further, the UE includes coordinating with the base station serving the UE to suppress a level of interference experienced by the UE based on the transmission mode associated with each base station serving the UE. The transmission mode is a Single-Input and Multiple-Output (SIMO) mode and Multiple-Input and Multiple-Output (MIMO) mode.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This invention is illustrated in the accompanying drawings, throughout which like reference letters indicate corresponding parts in the various Figures. The embodiments herein will be better understood from the following description with reference to the drawings, in which.

DETAILED DESCRIPTION OF INVENTION

Figure 1:
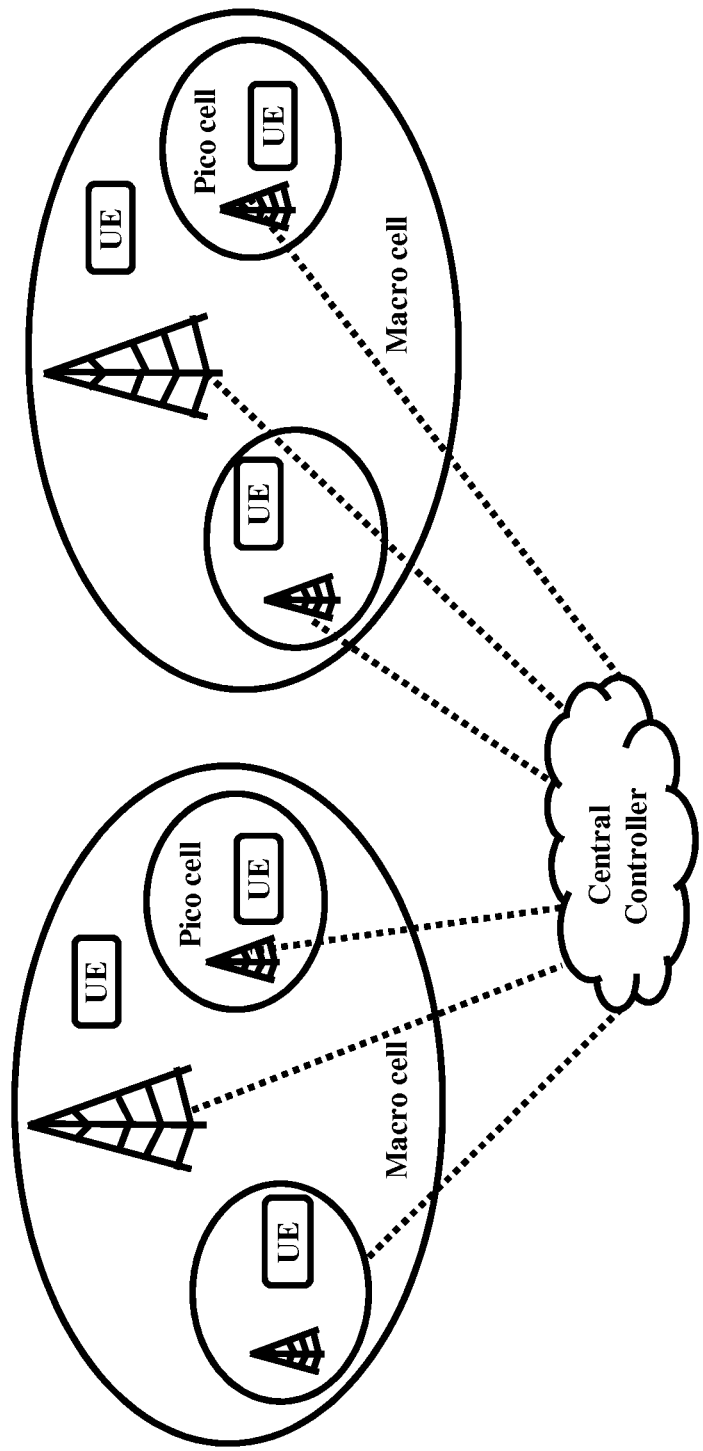
FIG. 1 illustrates a Heterogeneous Network (HetNet) including a plurality of Micro and Pico base stations, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments achieve a system and method for suppressing interference in a Heterogeneous Network (HetNet) including a base station serving a User Equipment (UE), and a plurality of neighbor base stations. The method includes sharing a parameter associated with the base station serving the UE and the plurality of neighbor base stations in the HetNet. Further, the method includes determining whether the UE is experiencing interference from the neighbor base station based on the parameter. Further, the method includes coordinating with the base station serving the UE to suppress a level of interference experienced by the UE based on the transmission mode associated with each base station serving the UE and the neighbor base station interfering at the UE. The transmission mode can be Single-Input and Multiple-Output (SIMO) mode and Multiple-Input and Multiple-Output (MIMO) mode.

The methods and systems disclosed herein simple and robust for interference suppression enhancement in the HetNets downlink. For single antenna systems, a transmission mode is proposed which uses a real-valued encoding for Macro BSs, and a complex-valued encoding for Pico BS's. Unlike conventional methods and systems, this provides the interference cancellation enhancement and higher performance for the UEs with interference from the neighbor base stations. The additional gain can be obtained by using Widely Linear (WL) processing at the UE where, the UE jointly processes the real and imaginary parts of the complex-valued received signal for enhancing the interference suppression gain. More specifically, the Pico base station UE receives a desired signal that uses complex encoding while the dominant Macro interferer has the real-encoding. The Pico base station receiver which jointly filters the real and imaginary parts of the received signal has additional degrees-of-freedom (DOF) which are used for suppressing the dominant Macro interference. This is accomplished by exploiting the correlations between the real and imaginary parts of the interference (or, the pseudo interference covariance).

Figure 2:
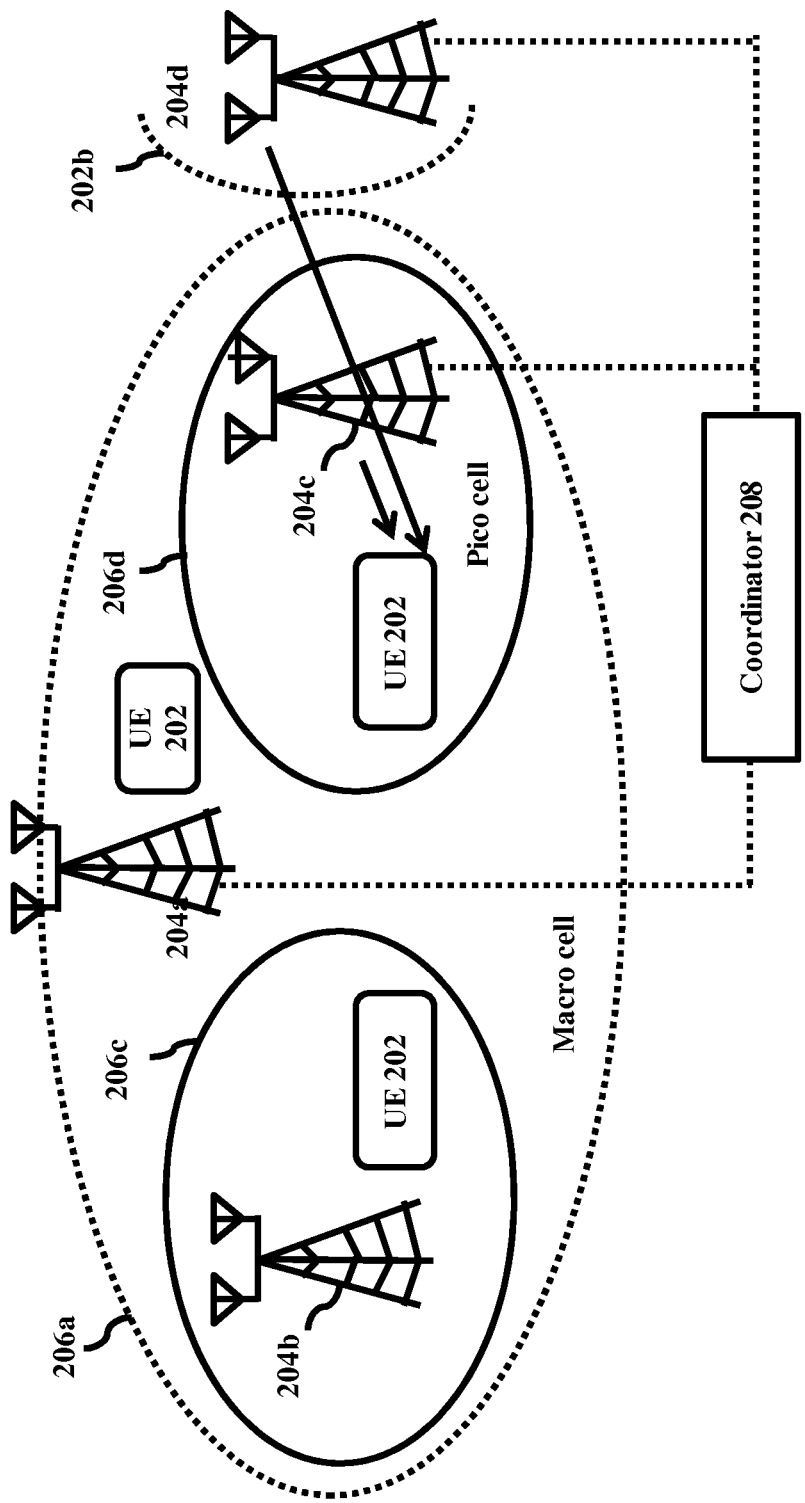
FIG. 2 illustrates a Multiple-Input & Multiple-Output (MIMO) mode coordination using a single stream transmission, according to embodiments as disclosed herein.
Figure 3:
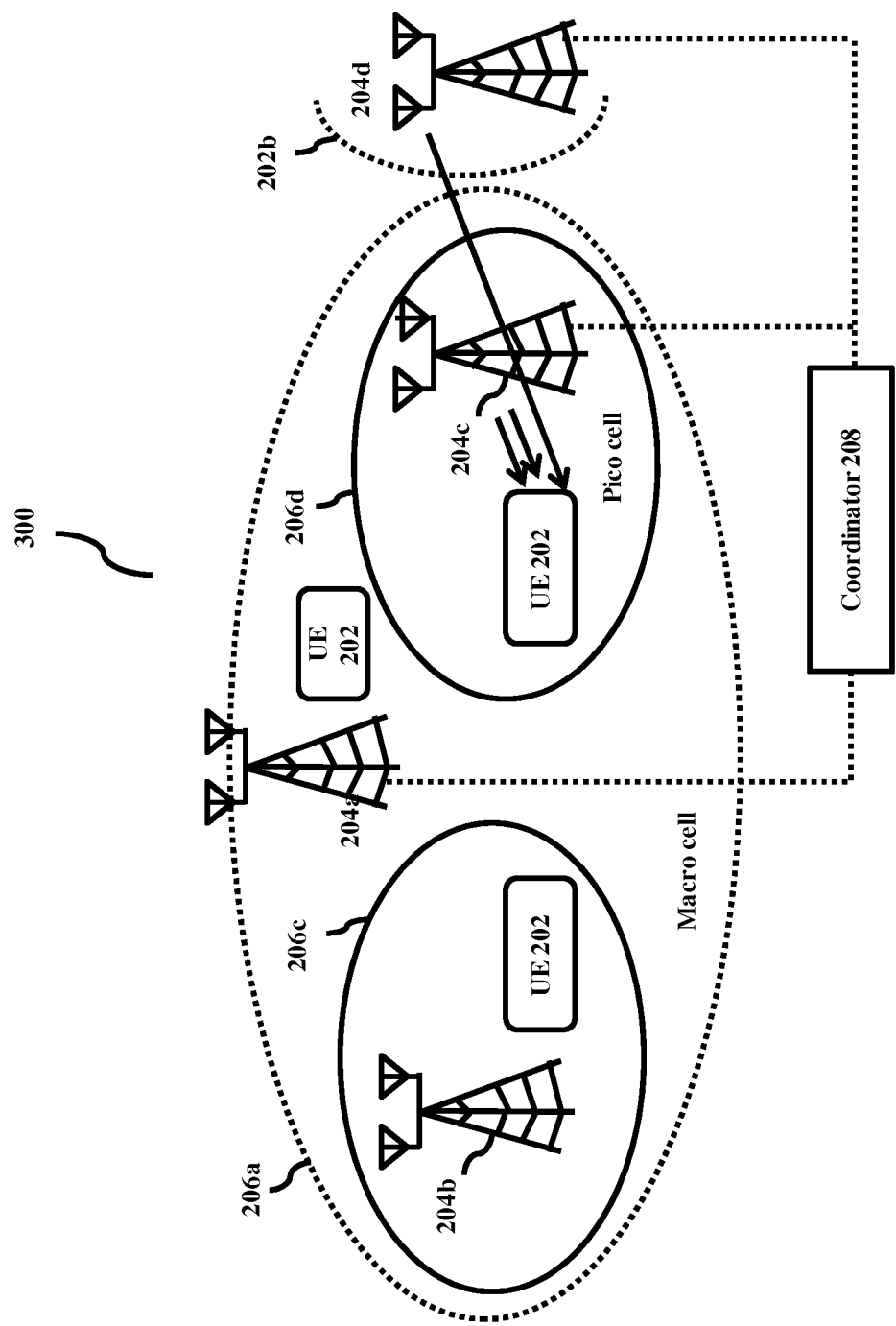
FIG. 3 illustrates a MIMO mode coordination using a single stream transmission from a group of Macro base station and multi stream spatial multiplexing from the serving Pico base station, according to embodiments as disclosed herein.
Figure 4:
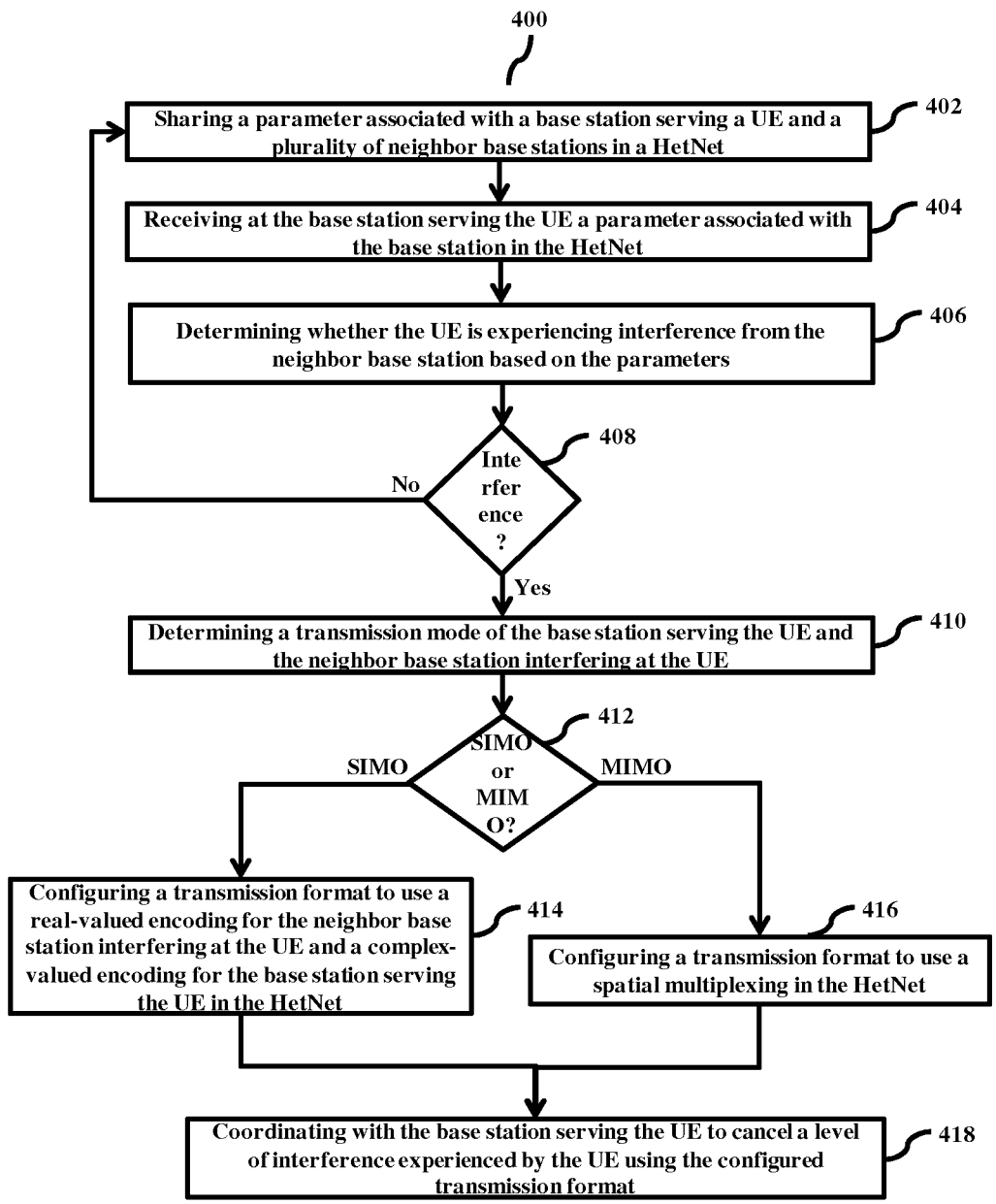
FIG. 4 is a flow diagram illustrating a method for interference suppression in a Heterogeneous Network (HetNet) including a base station serving a UE and a plurality of neighbor base stations, according to embodiments as disclosed herein.

Referring now to the drawings, and more particularly to FIGS. 2 through 4, where similar reference characters denote corresponding features consistently throughout the figures, there are shown preferred embodiments.

FIG. 2 illustrates an example wireless Heterogeneous Network (HetNet) 200, according to embodiments as disclosed herein. In an embodiment, the HetNet 200 described herein can be a Long-Term Evolution (LTE) Heterogeneous Network with asymmetric carrier aggregation or a LTE macro cells with millimeter wave (5G) small cells, both of which have provision for carrier aggregation independently. As shown in the FIG. 2, the HetNet 200 can include one or more User Equipments (UEs) 202, one or more macro base station(s) 204a and 204d, one or more Pico base station(s) 204b and 204c serving one or more UEs 202 with asymmetric bandwidth across different cell sites, and a coordinator 208. Each cell in the HetNet 200 can be controlled by a respective Base Station (BS) such as 206a, 206b, 206c and 206d. The BSs area 206a, 206b, 206c and 206d provide radio coverage within a geographical area forming respective cells such as the macro base station 204a, the Pico base station 204c, or the like.

The UE 202 described herein can be for example, but not limited to, a wireless communication terminal, a mobile cellular phone, a Personal Digital Assistant (PDA), a legacy user equipment, a wireless platform, a laptop, a computer or any other kind of device capable to communicate wirelessly with the BSs stations 204a, 204b, 204c, and 204d. The respective BSs 204a, 204b, 204c, and 204d may also be referred to as e.g. a NodeB, an evolved Node B (eNB, eNode B), a base transceiver station, access point base station, base station router, or any other network unit capable to communicate with a the UE 202 within the cells served by the respective BS.

In an example, the FIG. 2 illustrates a Multiple-Input and Multiple-Output (MIMO) mode coordination using a single stream transmission, according to embodiments as disclosed herein. The serving Macro BS 204a as well as the serving Pico BS 204c uses a single stream transmission mode using a real-valued or complex-valued encoding. The serving Macro BS 204a can be the one with the highest received signal power among the Macro BS 204d. The Macro BS 204d which is causing dominant interference to the UE 202 can employ a Single Stream Transmission (SST). In an embodiment, a transmission mode where the number of Spatial Multiplexing (SM) streams, modulation type, pilot formats applied at the Macro BSs 204a, and 204d and Pico BS 204c are coordinated and signaled to the UE 202. In another embodiment, the transmission mode where the number of SM streams, modulation type, pilot formats applied at the Macro BSs 204a, and 204d and the Pico BS 204c are coordinated and signaled among the base stations (both Macro and Pico BSs). In an embodiment, the selection of BS group, the UE 202, and the SM rates applied at the BSs depends on the scheduling decisions as well as on the UE 202 feedback. Alternatively, the coordination can be applied to the group of BSs and the group of UEs 202 over a specified time-frequency region.

The coordinator 208 can be configured to control the BS serving the UE 202 and the neighbor BSs. The coordinator 208 described herein can be for example, but not limited to, a central controller, a server, or any other component including sufficient firmware to control the various operation in the HetNet. In an embodiment, the coordinator 208 can receive the parameter associated with each base station in the HetNet. Upon receiving the parameter, the coordinator 208 can be configured to determine whether the UE 202 is experiencing interference from the neighbor base station. Further, the coordinator 208 can coordinate with the BS serving the UE 202 to suppress the level of interference experienced by the UE 202 based on the transmission mode associated with each BS serving the UE 202 and the neighbor base station interfering at the UE 202. The transmission mode can be the SIMO mode and the MIMO mode.

Further, the FIG. 2 shows an example overview of the wireless HetNet 200 but, it is to be understood that another embodiment is not limited thereto. Further, it is to be understood that the wireless network can be for example, but not limited to, 3rd Generation Partnership Project (3GPP) Wideband Code Division Multiple Access (WCDMA) system, Time Division Synchronous Code Division Multiple Access (TD-SCDMA), Global System for Mobile communications (GSM), Enhanced Data rate for GSM Evolution (EDGE), Worldwide Interoperability for Microwave Access (WiMax), Ultra Mobile Broadband (UMB), and the like. Furthermore, the wireless HetNet 200 can include different modules communicating among each other along with other hardware or software components. For example, the component can be, but not limited to, a process running in the UE or BS, an executable process, a thread of execution, a program embodied in a microprocessor, microcontroller or combination thereof. By way of illustration, both an application running on an UE and the UE can be the component.

FIG. 3 illustrates the MIMO mode coordination using a single stream transmission from a group of Macro BSs and multi stream SM from the serving Pico BS, according to embodiments as disclosed herein. In an embodiment, consider the UE 202 is associated with the Pico BS 204c and the serving Macro BS 204a uses a single stream transmission mode using a real-valued or complex-valued encoding. The serving Pico BS 204c uses multi-stream spatial multiplexing using the complex-valued encoding. Additionally, as shown in the FIG. 3, another Macro BS 204d that causes dominant interference at the UE employs a Single Stream Transmission (SST). For example, the Macro BS can use a SM rate of $N_m$ with the real-valued or complex-valued encoding and the Pico may use SM rate of $N_p$ with the real-valued or complex-valued encoding and selecting a particular combination of $N_m$ and $N_p$ with the real-valued or complex-valued encoding.

In an embodiment, the group of Macro and Pico BSs uses the SST with real-valued, complex-valued encoding, or a combination thereof. In an embodiment, the group of Macro BSs use the SST with complex-valued encoding and a group of Pico BSs uses two streams SM ($N_p$=2) with complex-valued encoding. The BSs can be coordinated with each other by exchanging information among each other. In an embodiment, the coordination can be implemented by using a coordinator where the parameters associated with the BSs are stored in it. The pluralities of BSs are connected to the coordinator 208 which coordinates the parameters to the base station serving the UE. In an embodiment, the coordinator 208, for example can coordinate the parameters associated with the BSs (both BS serving the user and neighbor BSs) to the UE. If the Macro BS controls the Pico BS under its coverage area then the coordination can be implemented among the Macro BS and the associated Pico BSs by the Macro BS.

Generally in the HetNet, employing multiple antennas at the BS and the UE, Spatial Multiplexing (SM) can be used. The multiplexing rate is defined as the total number of complex-valued symbols transmitted per unit time. The complex-valued transmission using $N_t$ antennas gives a multiplexing rate of $N_t$ while the real-valued transmission has a rate of Nt/2. The multiplexing rates in the range of [1/2, 1, 3/2 . . . $N_t$/2, $N_t$] can be obtained using a combination of the real-valued or complex-valued encoding. The transmission rates are coordinated at the Macro and Pico BSs and can apply interference suppression receivers which exploit the covariance of interference to maximize the interference cancellation gain of a typical user connected to the Macro/Pico base stations. By reducing the multiplexing rate at the Macro BSs results in higher overall performance. With $N_r$ receiver antennas, a widely linear (WL) receiver has $2N_r$ virtual antenna branches. This type of receiver can null $2N_r$–1 dominant interferers. In systems with $N_r$=$N_t$, by reducing the multiplexing rate at the Macro BS well below the maximum allowed rate of $N_t$, enhanced interference suppression ability for the UE connected with the Pico base station can be provided. In particular, the mode which uses SST using the real-encoding (rate=1/2) at the Macro BS and the SM with the rate of $N_t$ using complex-valued encoding at the Pico BSs can provide a higher cell interference suppression gain compared to other feasible modes. Alternatively, for modes that use the complex-valued encoding at both the Macro BS and Pico BS, the user can employ a conventional Minimum Mean-Square Error (MMSE) filtering. With $N_r$ receiver antennas, the MMSE receiver can null $N_r-1$ dominant interferers completely. A prewhitened-Maximum Likelihood Detector (MLD) receiver jointly detects the desired signal together with few dominant interferers and whitens the rest of the interference thereby, providing additional interference cancellation gain. Other receivers such as successive interference suppression can also be used to improve performance.

For example, consider the downlink of a two tier network composed of the Macro and Pico BSs. The BSs of the Macro tier can have a transmit power $P_m$. Similarly, the BSs of Pico tier can have a transmit power $P_p$. When a UE enters the HetNet, a pair of Macro and Pico BSs with highest received power level and the ratio of power levels of the Pico and Macro BSs are determined. Let the ratio be denoted as $\gamma$. The UE associates with the Pico BS if $\gamma$>Bias otherwise it associates with the Macro BS. Further, a system with the complex-valued encoding, SM with real-valued encoding, and SM with a mix of the complex-valued encoding and real-valued encoding are described below for the two tier network composed of the Macro and Pico BSs.

A. System with Complex-Valued Encoding:

The system model for UE connected to tier-1 (either Macro or Pico) is given by:

$$y = \sqrt{P_1} Hx + \sqrt{P_1} \sum_{x_1 \in \phi_1} G_1 x_1 + \sqrt{P_2} \sum_{x_2 \in \phi_2} G_2 x_2 + n \quad (1)$$

Where, n is additive white Gaussian noise, the data vectors x and $x_1$ have $N_1$ elements, and $x_2$ has $N_2$ elements, and H, G1 are matrices of size $N_r \times N_1$. Similarly, $G_2$ has a size of $N_r \times N_2$. Note that $\phi_1$ and $\phi_2$ denote the location of the group of BSs of tier-1 and 2 respectively. The scaling factor $P_i \varepsilon(P_m; P_p)$, where i=1, 2 depends on the user association i.e., $P_1=P_p$ and $P_2=P_m$ if the user associates with the Pico BS and $P_1=P_m$ and $P_2=P_p$ if the user associates with the Macro BS. Similarly $\phi_i \varepsilon(\phi_p, \phi_m)$ where, $\phi_m$, $\phi_p$ denote the location of the Macro and Pico BSs respectively. The MI for any given UE is given by $$I_c = \log [I + H^* R^{-1} H] \quad (2)$$

Where $$R = P_1 \sum_{x_1 \in \phi_1} G_1 G_1^* + P_1 \sum_{x_2 \in \phi_2} G_2 G_2^* + N_0 I$$

is the noise-plus-interference covariance matrix (ICM).

For the case of SST where $N_1=1$, if the UE employs MMSE interference suppression receiver, the following procedure can be used. Referring to the system model in eq. (1), the receiver applies a vector-valued receiver filter that weights and sums the elements of the received signal vector. The filter weights w are chosen to minimize the mean square error (or maximize the output Signal-to-Noise-Power-Ratio (SIR) between the filtered signal and desired signal. The MMSE weights are given by $w = H^* R^{-1}$.

Where, $$R = P_1 \sum_{x_1 \in \phi_1} G_1 G_1^* + P_1 \sum_{x_2 \in \phi_2} G_2 G_2^* + N_0 I$$

is the ICM. The post-SINR of the MMSE receiver is given by $H^* R^{-1} H$. The post-SINR is measured for each subcarrier and the receiver uses the measured information to calculate the Channel Quality Indicator (CQI) for the assigned resources and quantizes it; thereby, feeding back to the BS using the coordinator 208.

To determine the filter weights the receiver needs an estimate of the desired channel impulse response (H) and an estimate of the interference covariance matrix (R). The ICM can be estimated either by estimating the channels of dominant interferers or by estimating the ICM from the received pilot signals.

B. SM with Real-Valued Encoding:

Assuming that the system uses real-valued modulation alphabets, collecting the real and imaginary parts of the complex-valued received signal and stacking these samples in vector format, the signal model can be represented as $$\tilde{y} = \sqrt{P_1} \tilde{H}_r \tilde{x} + \sqrt{P_1} \sum_{x_1 \in \phi_1} \tilde{G}_{1,r} \tilde{x}_1 + \sqrt{P_2} \sum_{x_1 \in \phi_2} \tilde{G}_{2,r} \tilde{x}_2 + \tilde{n} \quad (3)$$

Where the notation $\tilde{A}_r$ denotes the real and imaginary parts of the vector/matrix stacked up in a column vector format.

$$\tilde{A}_r = \begin{bmatrix} \text{Real}(A) \\ \text{Imag}(A) \end{bmatrix} \quad (4)$$

The MI for this system model is given by $$I_r = \log [I + \tilde{H}_r^* \tilde{R}^{-1} \tilde{H}_r] \quad (5)$$

Where the symbol "*" denotes conjugate transpose operation $$\tilde{R} = P_1 \sum_{x_1 \in \phi_1} \tilde{G}_1 \tilde{G}_1^* + P_2 \sum_{x_2 \in \phi_2} \tilde{G}_2 \tilde{G}_2^* + \frac{N_0}{2} I \quad (6)$$

Eq. (6) is the noise-plus-interference covariance matrix of the WL receiver which jointly filters the real and imaginary parts of the received signal (alternatively, it filters the received signal and its complex-conjugate).

A WL MMSE receiver applies a vector-valued receiver filter $\tilde{w}$ that weights and sums the elements of the received signal vector $\tilde{y}$. The filter weights ($\tilde{w}$) are chosen to minimize the mean square error (or maximize the output SIR) between the filtered signal and desired signal $\tilde{x}$. For the case of SST, consider $N_1=1$. The WL MMSE weights are given by $\tilde{w} = \tilde{H}_r^* \tilde{R}^{-1}$.

Where $$\tilde{R} = P_1 \sum_{x_1 \in \phi_1} \tilde{G}_1 \tilde{G}_1^* + P_2 \sum_{x_2 \in \phi_2} \tilde{G}_2 \tilde{G}_2^* + \frac{N_0}{2} I$$

is the WL-ICM. The post-SINR of the WL receiver is given by $\tilde{H}_r^* \tilde{R}^{-1} \tilde{H}_r$. The post-SINR is measured for each subcarrier. The WL receiver uses this metric to calculate the channel quality indicator for the assigned resources.

C. SM with a Mix of the Complex-Valued and Real-Valued Encoding

1) System Model for Pico Users (Complex-Real):

The complex-valued modulation alphabets are employed for all the Pico BSs and the real-valued encoding for all the Macro BSs. Collecting the real and imaginary parts of the complex-valued received signal and stacking these samples in vector format, the signal model for the users associated with a Pico BS is represented as:

$$\tilde{y}_p = \sqrt{P_p}\, \tilde{H}_c \tilde{x}_r + \sqrt{P_p} \sum_{x_p \in \phi_p} \tilde{G}_{p,c} \tilde{x}_{p,r} + \sqrt{P_m} \sum_{x_m \in \phi_m} \tilde{G}_{m,r} \tilde{x}_m + \tilde{n} \quad (7)$$

Where, the notation $\tilde{A}_c$ denotes $$\tilde{A}_c = \begin{bmatrix} \text{Real}(A) & -\text{Imag}(A) \\ \text{Imag}(A) & \text{Real}(A) \end{bmatrix} \quad (8)$$

The MI for this system model is given by $$I_{c,r} = \log \lfloor I + \tilde{H}_c^* \tilde{R}_{c,r}^{-1} \tilde{H}_c \rfloor$$

Where, $$\tilde{R}_{c,r} = P_p \sum_{x_1 \in \phi_p} \tilde{G}_{p,c} \tilde{G}_{p,c}^* + P_m \sum_{x_m \in \phi_m} \tilde{G}_{m,r} \tilde{G}_{m,r}^* + \frac{N_0}{2} I.$$

The ML decision metric for a WL receiver that detects a complex modulated symbol is given by $\hat{x}_r = \arg\min_{\tilde{x}_r \in S} e^* \tilde{R}_{c,r}^{-1} e$ where $e = \tilde{y}_p - \sqrt{P_p} \tilde{H}_c \hat{x}_r$ and S is feasible set of vector-valued modulation symbols.

As an alternative to Widely Linear—Maximum Likelihood detector (WL-MLD), the receiver may use reduced state WL-MLD, or successive interference canceller that detects the real and imaginary parts of the constellation. As an alternative to the MLD, the receiver may use Maximum A posteriori Estimation (MAP) to obtain soft values for the bits.

MIMO Mode, Modulation, Pilot Coordination Using Macro and Pico BSs Pilots:

A selected group of Macro and Pico BSs transmits multi-antenna pilot signals that are specific to the single UE or the group of UEs. The pilot signals are used for estimating the channel impulse response of the desired BS as well as that of a set of dominant interfering BS s.

The pilots are designed such that the pilot tones are orthogonal in frequency, time, code, or some combination of frequency/time/code. In some cases, the codes used for pilot modulation may be quasi-orthogonal. The CSI-RS (Channel State Information Reference Signals) pilots or DM-RS (Demodulation Reference Signals) pilots specified in the LTE standard may be used for estimating the desired and dominant interfering channels.

FIG. 4 is a flow diagram illustrating a method 400 for suppressing interference in a HetNet including a base station serving a UE and a plurality of neighbor base stations, according to embodiments as disclosed herein. The various steps of the method 400 are summarized into individual block where, some of the steps are performed by the UE 202, the serving base station 204c, the neighbor base stations 204a, 204b, and 204d, the coordinator 208, or equivalent thereof. Further, the method 400 and other description described herein provides a basis for a control program which can be implemented using a microprocessor, microcontroller, or equivalent thereof.

In an embodiment, the base station serving the UE 202 can be a Pico base station. In another embodiment, the neighbor base station can be a Macro base station. At step 402, the method 400 includes sharing one or more parameters associated with the base station serving the UE 202 and the plurality of neighbor base stations in the HetNet. In an embodiment, the parameter associated with the base stations (both serving base station and neighbor base station) can be, for example and not limited to base station identifier, power level, number of spatial multiplexing streams, MIMO mode, modulation type used in a resource block, coding rate, pilot location, pilot type of the interferer to the UE 202, and the like. In another embodiment, the parameter associated with the base stations (both serving base station and neighbor base station) can be, for example and not limited to a, base station identifier, fixed power level, fixed spatial multiplexing stream, fixed modulation type used in a resource block, fixed coding rate, fixed pilot location, time-frequency resource, and fixed pilot type of the interferer to the UE 202. The parameters described herein can be shared among the UE 202, the base station serving the UE 202, the coordinator 208, and the neighbor base station, and the like.

At step 404, the method 400 includes receiving the parameter associated with each base station in the HetNet at the base station serving the UE 202. In an embodiment, the method 400 allows the UE 202 to receive the parameter associated with each base station in the HetNet. In an embodiment, the method 400 allows the coordinator 208 to receive the parameter associated with each base station (both base station serving the UE 202 and the neighbor base station). At step 406, the method 400 includes determining at the base station serving the UE 202 whether the UE 202 is experiencing any interference from the neighbor base station based on the received parameters associated with each base station in the HetNet. In an embodiment, the method 400 allows the UE 202 or the coordinator to determine whether it is experiencing interference from the neighbor base station based on the received parameter.

At step 410, the method 400 includes determining a transmission mode of the base station serving the UE 202 and the neighbor base station interfering at the UE 202 in response to determining the interference at step 408. In an embodiment, the transmission mode can be, for example and not limited to SIMO mode, and MIMO mode.

At step 414, the method 400 includes configuring a transmission format to use a real-valued encoding for the neighbor base station interfering at the UE 202 and a complex-valued encoding for the base station serving the UE 202 in the HetNet in response to determining that the transmission mode of the base station serving the UE 202 and the neighbor base station interfering at the UE 202 is the SIMO mode. In an embodiment, under SIMO mode, complex-valued encoding can also be applied at both the Macro Bs and the Pico BS. For instance, the method 400 allows the coordinator 208 to configure the transmission format of both the Macro Bs and the Pico BS to use the complex-valued encoding, such as to suppress the interference at the UE.

At step 416, the method 400 includes configuring a transmission format to use a spatial multiplexing in the HetNet in response to determining that the transmission mode of the base station serving the UE 202 and the neighbor base station interfering at the UE 202 is the MIMO mode. In an embodiment, for MIMO with SM, the complex-valued, the real-valued encoding, or a combination thereof can be applied at both the Macro and Pico tiers. For instance, the method 400 allows the coordinator 208 to configure the transmission format of both the Macro Bs and the Pico BS to use at least one of the complex-valued encoding and the real-valued encoding, such as to suppress the interference at the UE.

At step 418, the method 400 includes coordinating with the base station serving the UE 202 to suppress the level of interference experienced by the UE 202 using the configured transmission format. In an embodiment, the method 400 allows the UE 202 to coordinate with the coordinator 208 to suppress the level of interference experienced by the UE 202 using the configured transmission format.

The various actions, acts, blocks, steps, and the like in method 400 may be performed in the order presented, in a different order or simultaneously. Further, in some embodiments, some actions, acts, blocks, steps, and the like may be omitted, added, modified, skipped, and the like without departing from the scope of the invention.

Further, the example process of MIMO mode coordination to interference cancellation in various scenarios is explained below.

Signaling Procedures to Enable MIMO Mode, Modulation and Pilot Coordination and Interference Cancellation for the UE:

The UE 202 and the Macro/Pico BSs exchange certain information to enable coordination as well as to facilitate interference cancellation at the user. In an embodiment, the serving Macro or Pico BS indicates to the user a list with IDs of (BS ID and Sector ID) neighboring Macro and Pico BSs using the coordinator 208. The active Macro/Pico BSs that cause dominant interference to the UE 202 transmit synchronization signals or pilot signals or a combination of both. The UE 202 estimates the power levels of first N dominant Macro/Pico BSs. The UE 202 may feedback the relative power levels and the BS IDs back to serving Macro/Pico BS. Estimation of power levels may be carried out during cell search using synchronization signals or using pilots transmitted by the BSs.

In an embodiment, the desired BS may indicate at least one of BS ID, SM mode, modulation type used in the resource block (RB), coding rate, pilot locations, the pilot type of one or several dominant interferers to the user using the coordinator 208. In an embodiment, the interfering BS may indicate at least one of SM mode, modulation type used in the RB, coding rate, pilot locations, and pilot type to the UE 202 using the coordinator 208. In addition to knowledge of MIMO mode, and Pilot patterns, knowledge of modulation and coding type of the interfering BSs can be used by the user for enhancing the interference suppression gain.

MIMO Mode Coordination for a Group of UEs in a Fixed Time-Frequency Region:

In a fixed time-frequency region, a group of Macro BSs transmit signals with a fixed number of SM stream, fixed modulation type and a fixed pilot formats. Similarly, another group of Pico BSs transmit signals with a fixed number of SM stream, fixed modulation type and a fixed pilot formats. The number of SM streams, modulation type, and pilot formats are specific to the tier (Macro/Pico). The UE 202 that is scheduled in this region can implement an interference suppression receiver with high performance. This type of fixed allocation reduces the signaling overhead. The UE 202 with high interference may request the serving BS to assigned in this region using explicit feedback request. Alternatively, the BS can schedule UEs 202 in this region based on interference levels of the UE 202. A central controller/coordinator decides the characteristics of the time-frequency region, number of SM streams, modulation type, and Pilot formats used by each tier. Alternatively, the characteristics of the time-frequency region, number of SM streams, modulation type, and Pilot formats used by each tier are fixed.

In an embodiment, the coordination is applied at single Macro BS level. Specifically, the time-frequency region, number of SM streams, modulation type, and Pilot formats used by the Macro BS as well as the Pico BSs under the coverage area of the said Macro BS are fixed. Alternatively, the Macro BS may signal the parameters required for the coordination to the Pico BSs under its coverage.

Embodiments herein disclose a method and system of coordination of SM modes for UEs 202 with interference in a HetNet downlink. Throughput can be increased by enabling interference suppression at the UE 202. This is feasible by reducing the multiplexing rate at the Macro BSs while operating the Pico BSs possibly at a higher SM rate. Among the feasible modes, the transmission mode which uses real-valued encoding at the Macro BS and complex-valued encoding at the Pico BSs offers a higher performance. For single antenna systems, this mode offers an overall performance compared to real-valued or complex-valued encoding applied at both tiers. To reap this benefit, the receiver at the UE 202 jointly processes the real and imaginary parts of the complex-valued received signal to obtain a virtual antenna array of size 2Nr. The receiver exploits the interference covariance for rejecting both inter tier and intra-tier interference, while reliably decoding the SM data.

Alternatively, the mode that uses complex-valued encoding at both Macro and Pico BSs can use standard receivers that process the complex-valued baseband samples. Techniques like MMSE, MLD, reduced state MAP receivers can be used to enhance the receiver performance.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A method for suppressing interference in a Heterogeneous Network (HetNet) including at least one base station serving the at least one User Equipment (UE) and a plurality of neighbor base stations, the method comprising:

sharing at least one parameter, which comprises at least one of a base station identifier, a power level, a number of spatial multiplexing data streams, MIMO mode, a modulation type used in at least one resource block, a coding rate, a pilot location, a time-frequency resource and a pilot type of at least one interferer to the at least one UE, associated with the at least one base station serving the at least one UE and the plurality of neighbor base stations in the HetNet;

determining whether the at least one UE is experiencing interference from the at least one neighbor base station based on the at least one parameter;

determining a transmission mode of the at least one base station serving the at least one UE, and of the at least one neighbor base station interfering at the at least one UE, wherein the at least one base station serving the at least one UE uses a Multiple-Input and Multiple-Output (MIMO) transmission mode along with spatial multiplexing and the at least one neighbor base station interfering at the at least one UE uses a Single-Input and Multiple-Output (SIMO) transmission mode; and configuring a transmission format for the at least one neighbor base station interfering at the at least one UE and for the at least one base station serving the at least one UE in the HetNet based on the transmission mode, said configured transmission format facilitating suppression of a level of interference experienced by the at least one UE.

2. The method of claim 1, wherein configuring the transmission format for the at least one neighbor base station interfering at the at least one UE and the at least one base station serving the at least one UE in the HetNet based on the transmission mode comprises:

determining the transmission mode of the at least one base station serving the at least one UE and the at least one neighbor base station interfering at the at least one UE, wherein the transmission mode is one of the SIMO mode and the MIMO mode; and configuring the transmission format to use a real-valued encoding for the at least one neighbor base station interfering at the at least one UE and a complex-valued encoding for the at least one base station serving the at least one UE in the HetNet in response to determining that the transmission mode of the at least one base station serving the at least one UE and the at least one neighbor base station interfering at the at least one UE is one of the SIMO mode and the MIMO mode, wherein the configured transmission format helps to cancel the level of interference experienced by the at least one UE.

3. The method of claim 1, wherein configuring the transmission format for the at least one neighbor base station interfering at the at least one UE and for the at least one base station serving the at least one UE in the HetNet based on the transmission mode comprises:

configuring the transmission format to use a complex-valued encoding for the at least one neighbor base station interfering at the at least one UE and for the at least one base station serving the at least one UE in the HetNet in response to determining that the transmission mode of the at least one base station serving the at least one UE and at least one the neighbor base station interfering at the at least one UE is the SIMO mode; and coordinating with the at least one base station serving the at least one UE to cancel a level of interference experienced by the at least one UE using the configured transmission format.

4. The method of claim 1, wherein configuring the transmission format for the at least one neighbor base station interfering at the least one UE and the at least one base station serving the at least one UE in the HetNet based on the transmission mode comprises:

configuring the transmission format to use a spatial multiplexing and at least one of a real-valued encoding and a complex-valued encoding for the at least one neighbor base station interfering at the at least one UE and for at least one the base station serving the at least one UE in the HetNet in response to determining that the transmission mode of the at least one base station serving the at least one UE and the at least one neighbor base station interfering at the at least one UE is the MIMO mode; and coordinating with the at least one base station serving the at least one UE to cancel the level of interference experienced by the at least one UE using the configured transmission format.

5. The method of claim 1, wherein the at least one base station serving the at least one UE is a Pico base station.

6. The method of claim 1, wherein the at least one neighbor base station interfering at the at least one UE is a Macro base station.

7. The method of claim 1, wherein the at least one base station serving the at least one UE and the at least one neighbor base station is controlled using at least one coordinator.

8. The method of claim 1, wherein the at least one parameter is shared among the at least one UE, the at least one base station serving the at least one UE, the at least one coordinator, and at least one neighboring base station.

9. The method of claim 1, further comprising, coordinating with the at least one base station serving the at least one UE to suppress the level of interference experienced by the at least one UE based on the at least one transmission mode associated with the at least one base station serving the at least one UE and the at least one neighbor base station interfering at the at least one UE.

10. The method of claim 1, wherein the at least one parameter is shared among at least one of the at least one UE, said at least one base station serving the at least one UE and the at least one neighbor base station, wherein the sharing of the at least one parameter leads to the coordination.

11. The method of claim 1, wherein determining whether the at least one UE is experiencing interference from the at least one neighbor base station based on the at least one parameter comprises:

receiving, at the at least one base station serving the at least one UE, said at least one parameter associated with the at least one base station in said HetNet; and determining, at the at least one base station serving said at least one UE, whether the at least one UE is experiencing interference from the at least one neighbor base station based on said at least one parameter.

12. The method of claim 1, wherein determining whether the at least one UE is experiencing interference from the at least one neighbor base station based on the at least one parameter comprises:

receiving, at the at least one UE, the at least one parameter associated with the at least one base station in the HetNet; and determining, at the at least one UE, whether it is experiencing interference from at least one the neighbor base station based on the at least one parameter.

13. The method of claim 1, wherein determining whether the at least one UE is experiencing interference from at least one the neighbor base station based on the at least one parameter comprises:

receiving, at the coordinator, the at least one parameter associated with the at least one base station in the HetNet; and determining, at the coordinator, whether the at least one UE is experiencing interference from at least one the neighbor base station based on the at least one parameter.

14. A system for suppressing interference in a Heterogeneous Network (HetNet) at least one base station serving at least one User Equipment (UE) and a plurality of neighbor base stations, the system is configured to:

share at least one parameter, which comprises at least one of a base station identifier, a power level, a number of spatial multiplexing data streams, MIMO mode, a modulation type used in at least one resource block, a coding rate, a pilot location, a time-frequency resource and a pilot type of at least one interferer to the at least one UE, associated with the at least one base station serving the at least one UE and the plurality of neighbor base stations in the HetNet;

determine whether the at least one UE is experiencing interference from at least one the neighbor base station based on the at least one parameter; and determine a transmission mode of the at least one base station serving the at least one UE and of the at least one neighbor base station interfering at the at least one UE, wherein the at least one base station serving the at least one UE uses a Multiple-Input and Multiple-Output (MIMO) transmission mode along with spatial multiplexing and the at least one neighbor base station interfering at the at least one UE uses a Single-Input and Multiple-Output (SIMO) transmission mode; and configure a transmission format for the at least one neighbor base station interfering at the at least one UE and for the at least one base station serving the at least one UE in the HetNet based on the transmission mode, said configured transmission format facilitates suppression of a level of interference experienced by the at least one UE.

15. The system of claim 14, wherein configuring a transmission format for the at least one neighbor base station interfering at the at least one UE and for the at least one base station serving the at least one UE in the HetNet based on the transmission mode comprises:

determine the transmission mode of the at least one base station serving the at least one UE and the at least one neighbor base station interfering at the at least one UE wherein the transmission mode is one of the SIMO mode and the MIMO mode; and configure the transmission format to use a real-valued encoding for the at least one neighbor base station interfering at the at least one UE and a complex-valued encoding for the at least one base station serving the at least one UE in the HetNet in response to determining that the transmission mode of the at least one base station serving the at least one UE and the at least one neighbor base station interfering at the at least one UE is one of the SIMO mode and the MIMO mode, wherein the configured transmission format helps to cancel the level of interference experienced by the at least one UE.

16. The system of claim 14, wherein configuring the transmission format for the at least one neighbor base station interfering at the at least one UE and for the at least one base station serving the at least one UE in the HetNet based on the transmission mode comprises:

configuring the transmission format to use a complex-valued encoding for the at least one neighbor base station interfering at the at least one UE and for the at least one base station serving the at least one UE in the HetNet in response to determining that the transmission mode of the at least one base station serving the at least one UE and the at least one neighbor base station interfering at the at least one UE is the SIMO mode; and coordinating with the at least one base station serving the at least one UE to cancel a level of interference experienced by the at least one UE using the configured transmission format.

17. The system of claim 14, wherein configuring the transmission format for the at least one neighbor base station interfering at the at least one UE and the at least one base station serving the at least one UE in the HetNet based on the transmission mode comprises:

configure the transmission format to use a spatial multiplexing and at least one of a real-valued encoding and a complex-valued encoding for the at least one neighbor base station interfering at the at least one UE and for the at least one base station serving the at least one UE in the HetNet in response to determining that the transmission mode of the at least one base station serving the at least one UE and at least one the neighbor base station interfering at the at least one UE is the MIMO mode; and coordinate with the at least one base station serving the at least one UE to cancel a level of interference experienced by the at least one UE using the configured transmission format.

18. The system of claim 14, wherein the at least one base station serving the at least one UE is a Pico base station.

19. The system of claim 14, wherein at least one the neighbor base station interfering at the at least one UE is a Macro base station.

20. The system of claim 14, wherein the at least one base station serving the at least one UE and the at least one neighbor base station is controlled using at least one coordinator.

21. The system of claim 14, wherein the at least one parameter is shared among the at least one UE, the at least one base station serving the at least one UE, the at least one coordinator, and at least one neighboring base station.

22. The system of claim 14, wherein the system is configured to coordinate with the at least one base station serving the at least one UE to suppress the level of interference experienced by the at least one UE based on the at least one transmission mode associated with the at least one base station serving the at least one UE and the at least one neighbor base station interfering at the at least one UE.

23. The system of claim 14, wherein the at least one parameter is shared among at least one of the at least one UE, the at least one base station serving the at least one UE, and at least one the neighbor base station, wherein the sharing of said at least one parameter leads to the coordination.

24. The system of claim 14, wherein determine whether the at least one UE is experiencing interference from the at least one neighbor base station based on the at least one parameter comprises:

receive, at the at least one base station serving the at least one UE, the at least one parameter associated with the at least one base station in the HetNet; and determine, at the base station serving the at least one UE, whether the at least one UE is experiencing interference from at least one the neighbor base station based on the at least one parameter.

25. The system of claim 14, wherein determine whether the at least one UE is experiencing interference from said at least one neighbor base station based on the at least one parameter comprises:
  receive, at the at least one UE, the at least one parameter associated with the at least one base station in the HetNet; and
  determine, at the at least one UE, whether it is experiencing interference from the at least one neighbor base station based on the at least one parameter.

26. The system of claim 14, wherein determining whether the at least one UE is experiencing interference from the at least one neighbor base station based on the at least one parameter comprises:
  receiving at the coordinator the at least one parameter associated with the at least one base station in the HetNet; and
  determining at the coordinator whether the at least one UE is experiencing interference from at least one the neighbor base station based on the at least one parameter.

27. A User Equipment (UE) for suppressing interference in a Heterogeneous Network (HetNet) including at least one base station serving at least one UE and a plurality of neighbor base stations, wherein the at least one UE comprises:
  an integrated circuit further comprising at least one processor; and
  at least one memory having a computer program code within the circuit,
  wherein the at least one memory and the computer program code with the at least one processor cause the at least one UE to:
    sharing at least one parameter, which comprises at least one of a base station identifier, a power level, a number of spatial multiplexing data streams, MIMO mode, a modulation type used in at least one resource block, a coding rate, a pilot location, and a pilot type of at least one interferer to the at least one UE, associated with the at least one base station serving the at least one UE and the plurality of neighbor base stations in the HetNet;
    determining whether the at least one UE is experiencing interference from at least one the neighbor base station based on the at least one parameter;
    determining a transmission mode of the at least one base station serving the at least one UE and the at least one neighbor base station interfering at the at least one UE, wherein the at least one base station serving the at least one UE uses a Multiple-Input and Multiple-Output (MIMO) transmission mode along with spatial multiplexing and the at least one neighbor base station interfering at the at least one UE uses a Single-Input and Multiple-Output (SIMO) transmission mode; and
    configuring a transmission format for the at least one neighbor base station interfering at the at least one UE and for the at least one base station serving the at least one UE in the HetNet based on the transmission mode, wherein the configured transmission format facilitates suppression of a level of interference experienced by the at least one UE.

28. The UE of claim 27, wherein configuring the transmission format for the at least one neighbor base station interfering at the at least one UE and for the at least one base station serving the at least one UE in the HetNet based on the transmission mode comprises:
  determining the transmission mode of the at least one base station serving the at least one UE and the at least one neighbor base station interfering at the at least one UE, wherein the transmission mode is one of the SIMO mode and the MIMO mode; and
  configuring the transmission format to use a real-valued encoding for the at least one neighbor base station interfering at the at least one UE and a complex-valued encoding for the at least one base station serving the at least one UE in the HetNet in response to determining that the transmission mode of said at least one base station serving the at least one UE and at least one said neighbor base station interfering at the at least one UE is one of the SIMO mode and the MIMO mode, wherein the configured transmission format helps to cancel the level of interference experienced by the at least one UE.

29. The UE of claim 27, wherein configuring the transmission format for the at least one neighbor base station interfering at the at least one UE and for the at least one base station serving the at least one UE in the HetNet based on the transmission mode comprises:
  configuring the transmission format to use a complex-valued encoding for the at least one neighbor base station interfering at the at least one UE and for the at least one base station serving the at least one UE in the HetNet in response to determining that the transmission mode of the at least one base station serving the at least one UE and at least one the neighbor base station interfering at the at least one UE is the SIMO mode; and
  coordinating with the at least one base station serving the at least one UE to cancel a level of interference experienced by the at least one UE using the configured transmission format.

30. The UE of claim 27, configuring the transmission format for the at least one neighbor base station interfering at the least one UE and the at least one base station serving the at least one UE in the HetNet based on the transmission mode comprises:
  configuring the transmission format to use a spatial multiplexing and at least one of a real-valued encoding and a complex-valued encoding for the at least one neighbor base station interfering at the at least one UE and for at least one the base station serving the at least one UE in the HetNet in response to determining that the transmission mode of the at least one base station serving the at least one UE and the at least one neighbor base station interfering at the at least one UE is said MIMO mode; and
  coordinating with the at least one base station serving the at least one UE to cancel the level of interference experienced by the at least one UE using the configured transmission format.

31. The UE of claim 27, wherein the at least one base station serving the at least one UE is a Pico base station.

32. The UE of claim 27, wherein the at least one neighbor base station interfering at the at least one UE is a Macro base station.

33. The UE of claim 27, wherein the at least one base station serving the at least one UE and the at least one neighbor base station is controlled using at least one coordinator.

34. The UE of claim 27, wherein the at least one parameter is shared among the at least one UE, the at least one base station serving the at least one UE, the at least one coordinator, and at least one neighboring base station.

35. The UE of claim 27, wherein the at least one parameter comprises at least one of a base station identifier, a fixed power level, a fixed spatial multiplexing stream, a fixed modulation type used in at least one resource block, a fixed coding rate, a fixed pilot location, a fixed pilot type, and a time-frequency resource.

36. The UE of claim 27, wherein the at least one parameter is shared among at least one of said UE, the at least one base station serving the at least one UE, and the at least one neighbor base station, wherein the sharing of the at least one parameter leads to the coordination.

37. The UE of claim 27, wherein determining whether the at least one UE is experiencing interference from the at least one neighbor base station based on the at least one parameter comprises:
 receiving, at the at least one base station serving the at least one UE, the at least one parameter associated with the at least one base station in the HetNet; and
 determining, at the at least one base station serving the at least one UE, whether the at least one UE is experiencing interference from the at least one neighbor base station based on the at least one parameter.

38. The UE of claim 27, wherein determining whether the at least one UE is experiencing interference from the at least one neighbor base station based on the at least one parameter comprises:
 receiving, at the at least one UE, the at least one parameter associated with the at least one base station in the HetNet; and
 determining, at the at least one UE, whether it is experiencing interference from the at least one neighbor base station based on the at least one parameter.

39. The UE of claim 27, wherein determining whether the at least one UE is experiencing interference from the at least one neighbor base station based on the at least one parameter comprises:
 receiving at the coordinator the at least one parameter associated with the at least one base station in said HetNet; and
 determining at the coordinator whether t h e at least one UE is experiencing interference from the at least one neighbor base station based on the at least one parameter.

* * * * *